(No Model.)   3 Sheets—Sheet 1.

A. LINDEMANN.
VALVE OPERATING MECHANISM.

No. 355,457. Patented Jan. 4, 1887.

Witnesses:
Hamilton D. Turner.
William D. Couser.

Inventor:
A. Lindemann
by his Attorneys
Howson & Sons

N. PETERS. Photo-Lithographer, Washington, D. C.

(No Model.) 3 Sheets—Sheet 3.

A. LINDEMANN.
VALVE OPERATING MECHANISM.

No. 355,457. Patented Jan. 4, 1887.

Witnesses:
Hamilton D. Turner
William D. Courier

Inventor;
A. Lindeman
by his Attorneys
Howson & Son

UNITED STATES PATENT OFFICE.

AUGUST LINDEMANN, OF ALLENTOWN, PENNSYLVANIA.

VALVE-OPERATING MECHANISM.

SPECIFICATION forming part of Letters Patent No. 355,457, dated January 4, 1887.

Application filed June 10, 1886. Serial No. 204,744. (No model.)

*To all whom it may concern:*

Be it known that I, AUGUST LINDEMANN, a subject of the Emperor of Germany, residing in Allentown, Pennsylvania, have invented certain Improvements in Valve-Operating Mechanism for Steam-Engines, of which the following is a specification.

My invention relates to that class of engines which have main and cut-off valves, one object of my invention being to provide simple and efficient mechanism for varying the cut-off, either automatically or otherwise, and further objects of my invention being to lessen the friction on the shafts which operate the valves, and to provide ready means of compensating for loss due to wear of the driving-shafts or their bearings.

Figure 1:
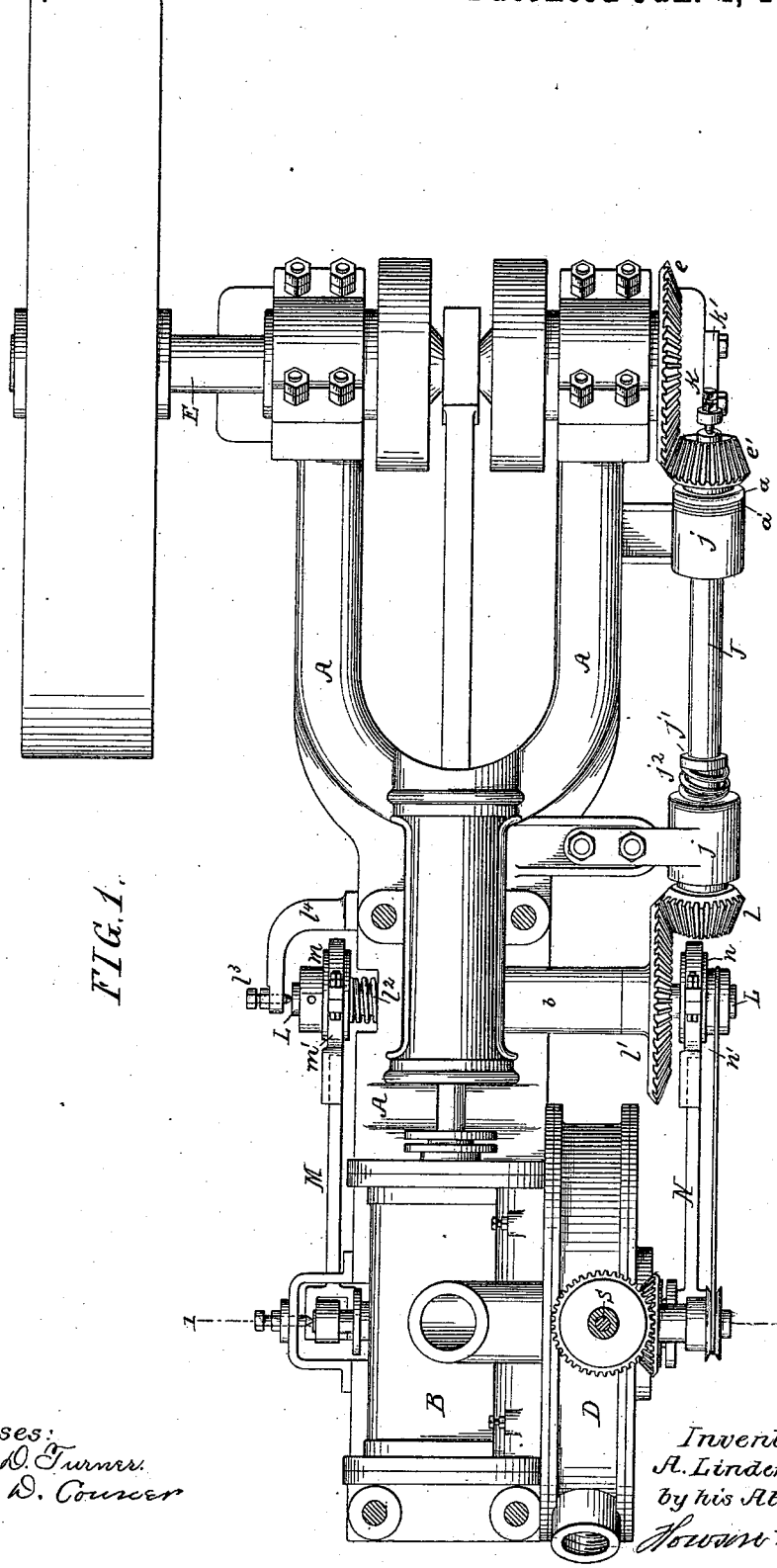
Figure 2:
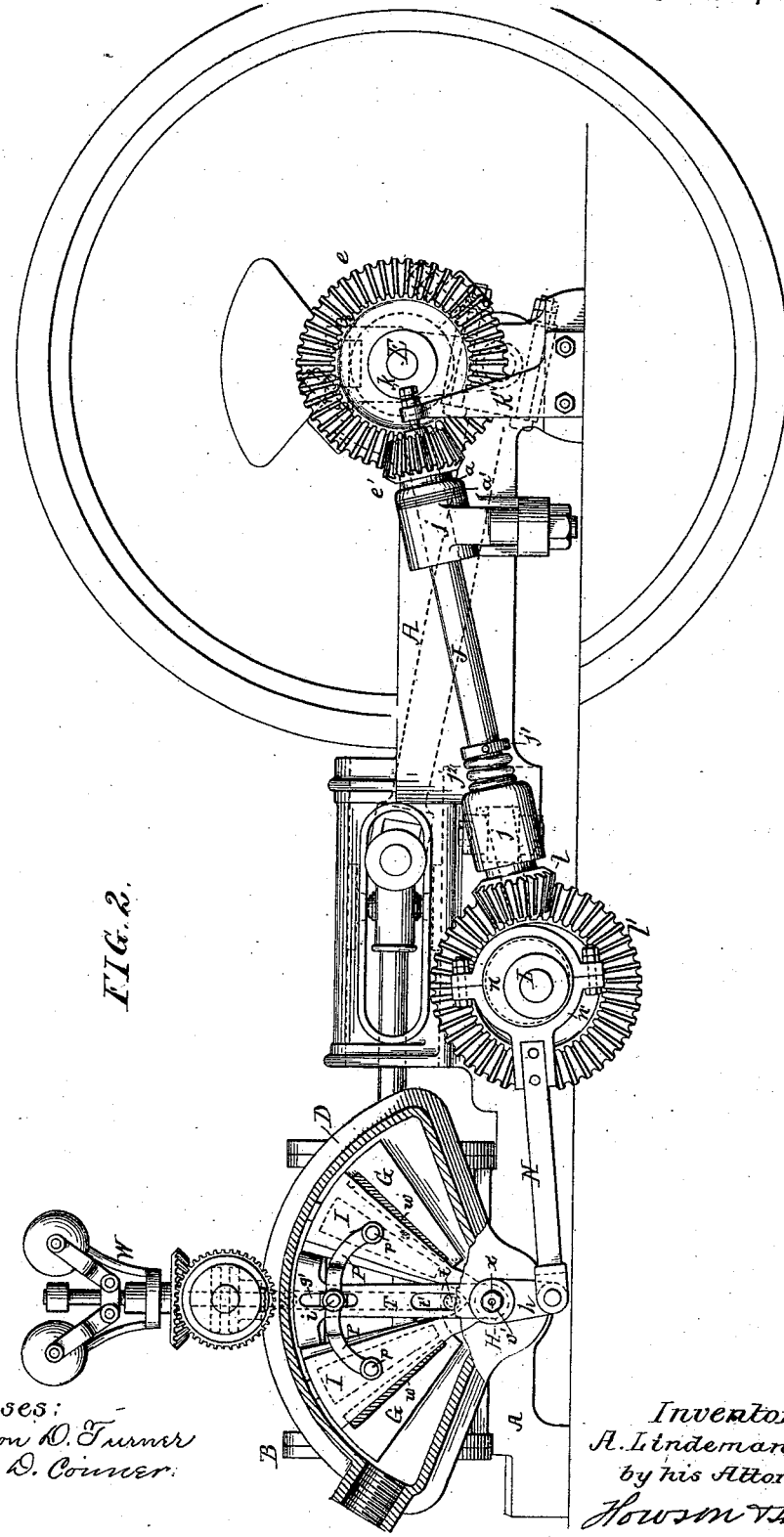
Figure 3:
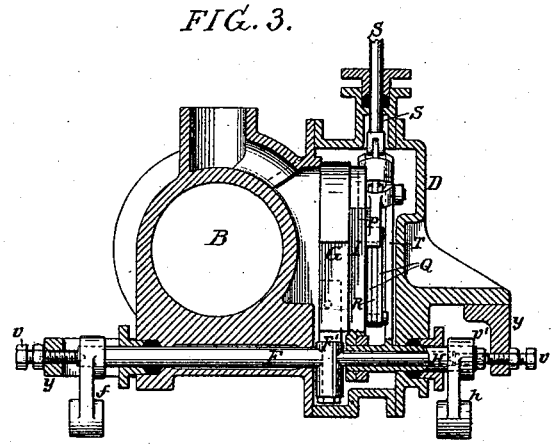
Figure 5:
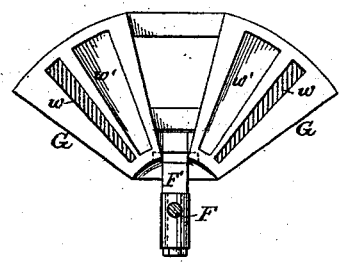
Figure 4:
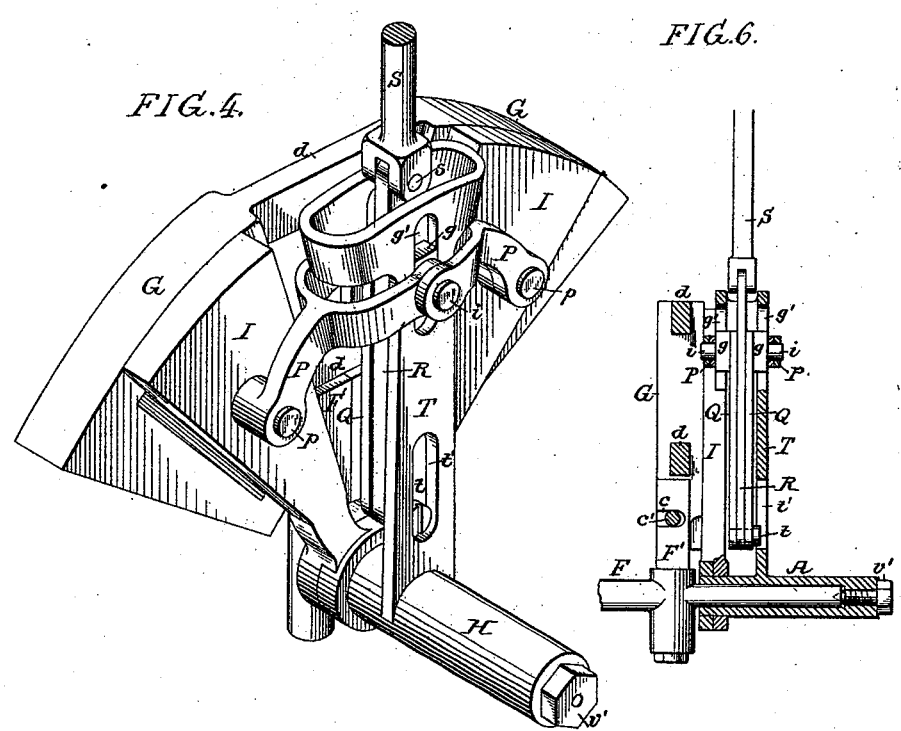

In the accompanying drawings, Figure 1 is a sectional plan view of an engine showing my improved valve-gear. Fig. 2 is a side view with part of the valve-chest cover broken away, in order to show the valves. Fig. 3 is a transverse section, partly in elevation, on the line 1 2, Fig. 1. Fig. 4 is a detached perspective view of the valves and cut-off-valve-operating devices detached from the chest. Fig. 5 is a face view of the main valve detached from the chest, and Fig. 6 a transverse section of the main and cut-off valves on a larger scale than Fig. 3.

A is the frame of the engine, B the cylinder, and E the crank-shaft, all of which parts, as well as the piston, piston-rod, connecting-rod, guides, &c., may be of the usual or of any desired construction, my invention having no particular reference thereto.

The valve-chest D is at one side of the cylinder B, and is in the form of a segment of a circle having its center at $x$. This point $x$ is the axis of a rock-shaft, F, to which are connected the main valves G of the engine, the shaft carrying a sleeve, H, by which movement is transmitted to the cut-off valves I I, which are also under the control of the governor, as described hereinafter.

On the crank-shaft E is a bevel-wheel, $e$, gearing into a bevel-pinion, $e'$, on a shaft, J, having its bearings in brackets $j\ j$, secured to the frame A of the engine. This shaft J has a collar, $a$, which bears against washers $a'$, interposed between the collar and the end of the upper bearing $j$, and on the shaft is another collar, $j'$, between which and the lower bearing $j$ is a spring, $j^2$, which tends to maintain the upper end of the shaft J in contact with a center pin, $k$, which is tapped into a post, $k'$, secured to the frame of the engine, as shown in Fig. 2. By this means the shaft can be adjusted longitudinally, so as to cause the collar $a$ to have a proper bearing at all times on the washers $a'$, and thus compensate for any wear of the parts, the spring $j^2$ tending to sustain the weight of the shaft, and thus permit the end pressure to be regulated by the set-screw.

The shaft J may have conical bearings in the brackets $j$, if desired.

On the lower end of the shaft J is a bevel-pinion, $l$, gearing into a bevel-wheel, $l'$, which is secured to a transverse shaft, L. This shaft is adapted to a bearing, $b$, on the frame A, and has a spring, $l^2$, the tendency of which is to maintain the hub of the wheel $l'$ in contact with the bearing, the degree of pressure being regulated by the adjustment of a center pin, $l^3$, which is tapped into a bracket, $l^4$, on the frame. (See Fig. 1.)

On the shaft L are two eccentrics, $m$ and $n$, the former for operating the main slide-valves and the eccentric $n$ for operating the cut-off valves. The main valve-rod M has at one end an eccentric-strap, $m'$, adapted to the eccentric $m$, and said rod is connected at its opposite end to an arm, $f$, on the rock-shaft F. The cut-off-valve rod N on the opposite side of the engine has a strap, $n'$, which is adapted to the eccentric $n$, and the rod is connected to an arm, $h$, secured to the tubular shaft or sleeve H, which operates the cut-off valves.

The two valves G are connected by bars $d$, so as to constitute practically one structure, which is supported upon an arm, F', of the shaft F, said arm having a recess, $c$, for the reception of a transverse pin, $c'$, on the valve structure, so that while said valve structure vibrates with the arm F' it is free to move toward the valve-seat as the valve or seat wears.

Each valve has an inlet-port, $w$, and an exhaust-port, $w'$, which operate in conjunction with suitable inlet and exhaust ports in the cylinder. The cut-off valves I I are flat segmental plates hung loosely to the sleeve H, and the vibrating movement of these valves is derived from the sleeve, an arm, T, on the latter, having slots $g'$, forming guides for blocks $g$ to a projecting pin, $i$, on which are hung the forked inner ends of links P, the outer ends of which are hung to pins $p$ on the valves I. It will thus be seen that the arms P form a toggle, the center pin, $i$, of which is free to move in a direction different from that of the movement of the valves; hence by the elevation or depression of the pin $i$ this toggle will be contracted or expanded and the valves I drawn together or forced apart, this movement being wholly independent of the vibrating movement derived from the arm T.

The pin $i$ may be adjusted by hand when an automatic variable cut-off is not desired; but by connecting the said pin to the governor I am enabled to render the variation of the cut-off automatic, as will be readily understood.

Figure 6:
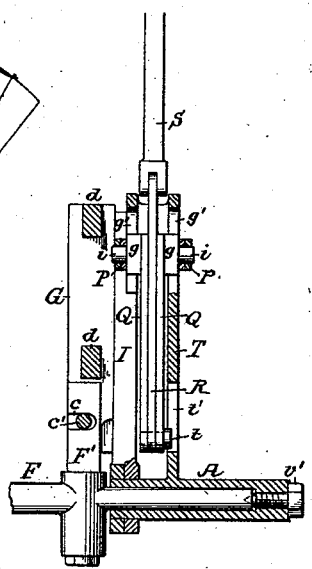

The governor W may be of any ordinary construction, and the connection of the pin $i$ to the governor I prefer to effect by means of the devices shown in Figs. 3, 4, and 6, on reference to which it will be seen that each block $g$ is connected by means of a rod, Q, to a pin, $t$, at the lower end of a link, R, the upper end of which is hung by a pin, $s$, to the governor-rod S.

The pin $t$ projects into a slot, $t'$, in the arm T, so as to permit the necessary vertical movement. Owing to the fact that this connecting-pin $t$ is close to the axis of the arm T, the lateral swing of the pin is but slight, and the distance of the pin $t$ from the pivot-pin $s$ of the link is such that the arc in which said pin swings is almost flat, so that there is no material variation in the vertical position of the pin $i$ due to this movement.

The shaft F and sleeve H pass through stuffing-boxes on the frame A, and in order to provide for the proper centering and support of said shaft F and sleeve H, I hang the same upon opposite center pins, $v$, carried by brackets $y$ on the frame A. One of the pins $v$ has its bearing in the end of the shaft F; but the other pin $v$ has its bearing in a pin, $v'$, screwed into the end of the sleeve H, and forming a bearing for the inner end of the shaft.

In applying my invention to an engine having but one set of valves G I, instead of two sets, as described, one of the links P of the toggle is dispensed with.

I claim as my invention—

1. The combination of a main valve, a cut-off valve, and actuating mechanism therefor having a uniform throw, with a link connecting said valve to the operating device therefor, and having one end adjustable in a direction different from that of the movement of the valve, all substantially as specified.

2. The combination of the main valves and cut-off valves, and actuating mechanism therefor having a uniform throw, with a toggle connecting said cut-off valves to the operating device therefor, and having a center pin adjustable in a direction different from that of the regular throw of the valves, all substantially as set forth.

3. The combination of the main valves, the cut-off valves, and actuating mechanism therefor having a uniform throw, with a toggle connecting the cut-off valves to the operating device therefor, and a governor, the rod of which is connected to the center pin of the toggle, all substantially as specified.

4. The combination of a main valve, a cut-off-valve, and vibrating arms for actuating the same, a link connected at one end to the cut-off valve, a slide connected to the other end of the link and guided in the vibrating arm, a governor-rod having a pendent link, and a rod whereby the pendent link is connected to said slide, all substantially as specified.

5. The combination of the valves, the shaft F and sleeve H, the center-pin, $v$, and a pin, $v'$, carried by the end of the sleeve H and forming the center for the shaft F, and a center bearing for one of the pins $v$, all substantially as specified.

In testimony whereof I have signed my name to this specification in the presence of two subscribing witnesses.

AUGUST LINDEMANN.

Witnesses:
WILLIAM F. DAVIS,
HARRY SMITH.